Oct. 2, 1956 — R. D. BOND ET AL — 2,765,127
HOSE REEL
Filed Aug. 12, 1952 — 2 Sheets-Sheet 1
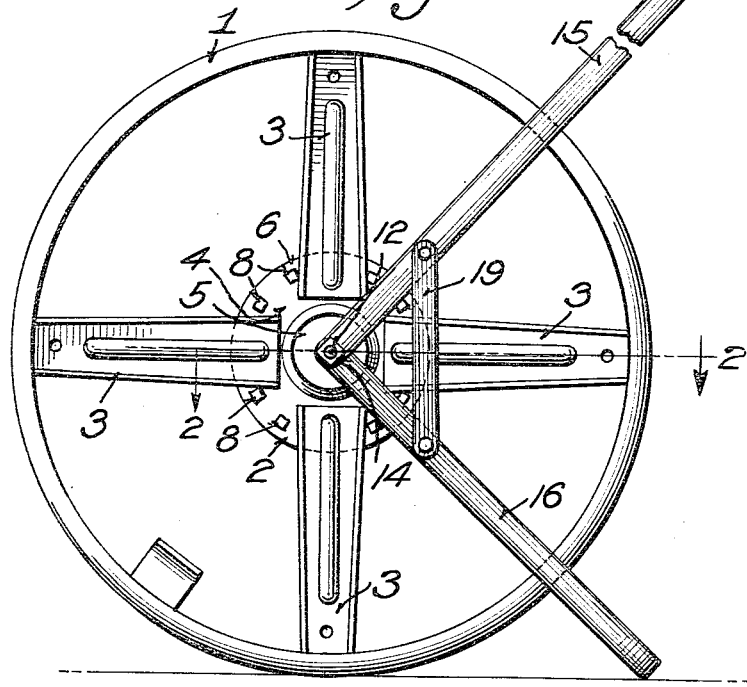
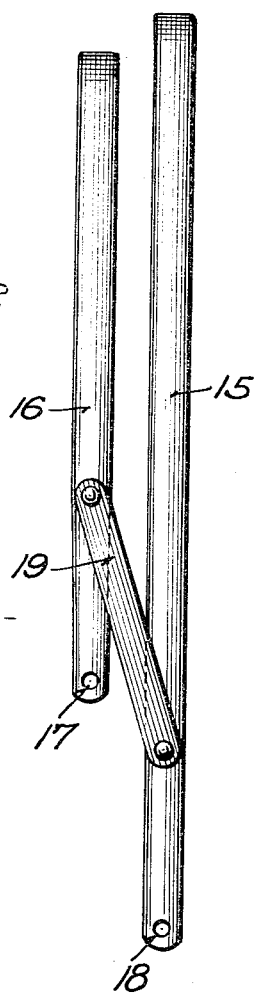
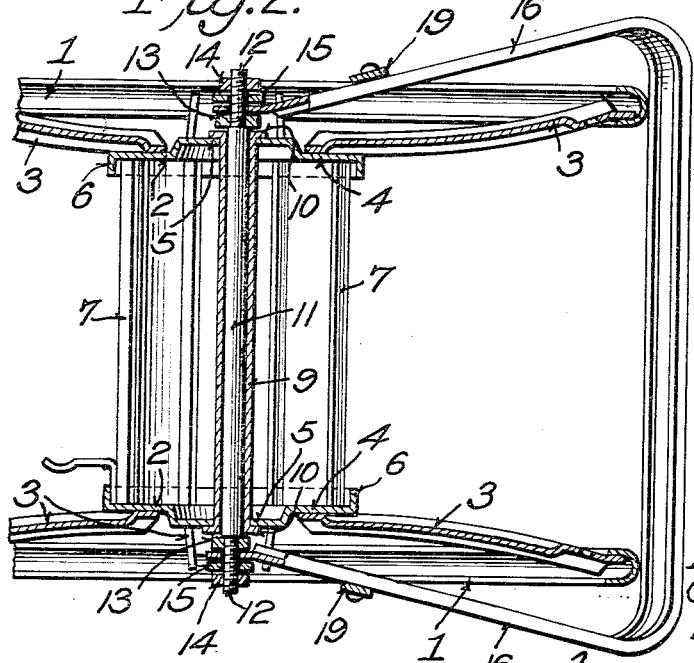
INVENTORS
ROBERT D. BOND,
GERARD J. HUNGERFORD,
BY Mason, Mason & Sheridan
ATTORNEYS Oct. 2, 1956

R. D. BOND ET AL 2,765,127

HOSE REEL

Filed Aug. 12, 1952

INVENTORS
ROBERT D. BOND,
GERARD J. HUNGERFORD,
BY Mason, Mason & Sheridan
ATTORNEYS ered with a central opening — 

United States Patent Office 2,765,127
Patented Oct. 2, 1956

2,765,127

HOSE REEL

Robert D. Bond, Detroit, and Gerard J. Hungerford, Wyandotte, Mich., assignors to Douglas Machine Products Co., Wyandotte, Mich., a corporation of Michigan Application August 12, 1952, Serial No. 303,848

4 Claims. (Cl. 242—86)

This invention pertains to an improved hose reel for carrying garden hose, and reel being of the portable type.

An object of the invention is to improve the construction of the reel disclosed in our co-pending application Serial No. 135,138, filed December 27, 1949, now Patent No. 2,610,003, granted September 9, 1952.

Another object relates to an improved axle and handle mounting whereby to provide a freely turning reel and a better handle supporting means.

A further object is to provide a hose reel having a non-rotating type of axle having an extended supporting surface for the reel bearing sleeve.

A further object is to provide a hose reel which is, except for axle and units composed entirely of sheet metal, the construction being such that the handle and other parts may be readily disassembled for shipping purposes.

Other objects will appear hereinafter throughout the specification, reference being had to the accompanying drawings wherein like characters of reference denote corresponding parts throughout all the views of which:

Figure 1 is an end view of the hose reel with combined handle and support attached thereto;

Figure 2 is a section of the reel, partly broken away and taken on the line 2—2 of Figure 1;

Figure 3 is a side elevational view of the combined support and handle member in folded position;

Figure 4:
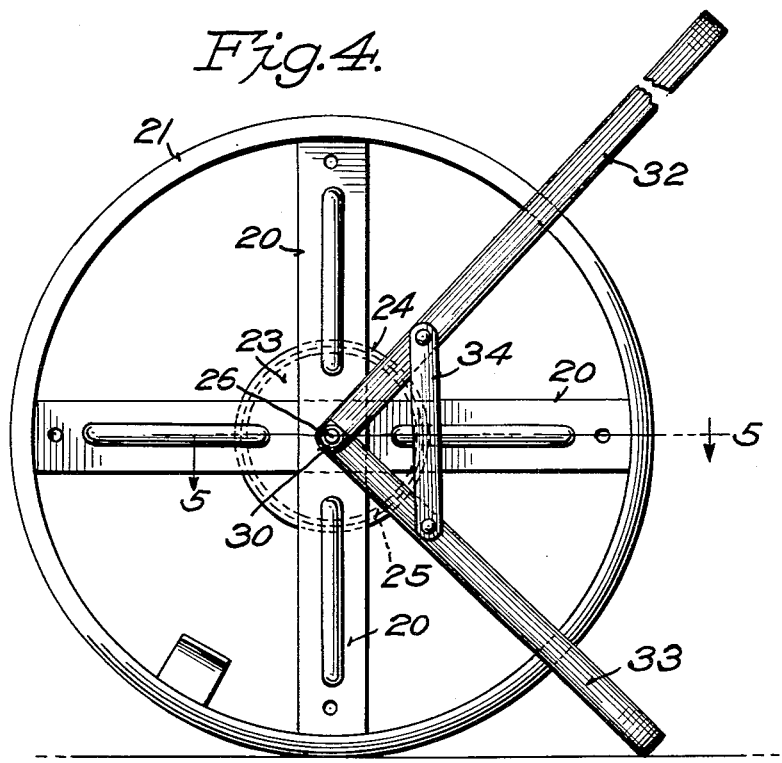
Figure 4 is an end view of a modified form of the invention.

Referring to Figures 1 to 3 specifically, the hose reel includes a pair of wheels comprising a pair of rims 1, a pair of hub plates 2 and a plurality of spoke-like members 3. The spoke-like members are permanently secured to the respective rims and hub plates by suitable means, such as by welding.

Each hub plate has a cylindrical depressed portion 4 to which the inner spoke ends are welded, and outwardly extended portions 5. The portions 4 are provided with cylindrical surfaces 6 as seen in Figure 2, which serve to inclose the separator members 7 whose ends 8 extend through the hub plates and are turned down as seen in Figure 1.

Each of the hub plates is provided with a central opening through which extends the reel supporting sleeve 9 whose ends 10 are peened over the hub plates so as to tightly frictionally engage the outwardly extending portions 5 thereof. These ends 10 may also be welded to the plates.

The axle 11 is of slightly less diameter than the inside diameter of the sleeve 9 so as to provide a clearance of between .010 to .020 of an inch and the threads 12 of the shaft are separated from each other by a distance only slightly greater than the distance of the outside surfaces of the sleeve ends 10. The spacing is a feature of the invention as it insures free running of the reel on the shaft.

There is provided an inside pair of nuts 13 which in assembling are rotated until the ends of the threads 12 are reached and in this position the nuts are slightly spaced from the sleeve ends 10. The outside nuts 14 may be held in position by lock nuts, not shown.

Between each inside and outside nut is a space occupied by the ends of the handle members 15 and 16. These handle ends are provided with apertures 17 and 18 and connecting links 19 by which they are pivoted to each as seen in Figures 1 and 3. Apertures 17 and 18 permit threading of the handle ends on the shaft.

Figure 5:
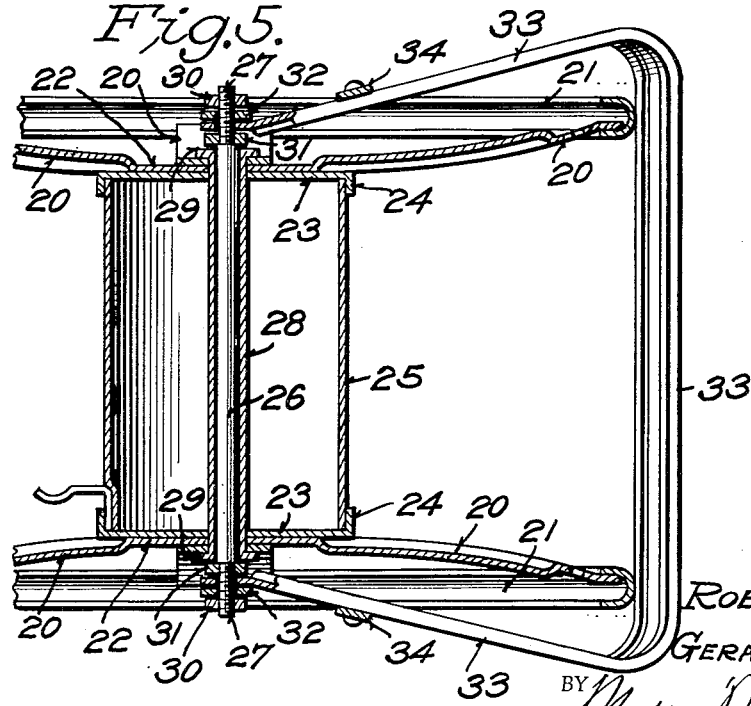
Figure 5 is a section of the reel shown in Figure 4, partly broken away and taken on the line 5—5 of Figure 4.

Figures 4 and 5 disclose a modified construction wherein the spoke-like members 20 are substantially the same length as the diameter of the wheels 21, and are provided with inwardly extending offset portions 22. The offset portions engage and may be welded to the hub plates 23, whose cylindrical surfaces inclose the drum 25. The drum is preferably welded to the cylindrical hub surfaces.

The axle is indicated at 26 and is provided with ends 27 that are screw threaded. The axle supports the sleeve 28 whose turned over ends 29 may be welded or secured by rivets or other fastening means to the spoke-like members. This construction closely resembles that of Figures 1 and 2 except that in Figures 5 and 6 the spoke-like members are apertured for the reception of the axle. The outside pair of nuts 30 is spaced from the inside pair 31 by the apertured ends of handle members 32 and 33. The handle members are connected to each other by links 34, so that when disassembled from the reel, the links may be folded in the same manner as shown in Figure 3. The handle members and connecting links are the same shape and size for each of the two forms of the invention shown in the figures.

It will be understood that both forms of the invention disclose wheels comprising rims, spokes, drum (or separator members), hub plates and sleeve which are rigidly connected to each other and which rotate as one on the shaft, and that the outside and inside pairs of nuts rigidly connect the axle and handle members with each other due to the tightening of the outside pair of nuts to force the ends of the handle members against the inside nuts. In this way wearing down of the screw threads by the apertures ends of the handle members is prevented.

It will be further appreciated that the present construction provides an extended bearing surface for the bearing sleeve, that is, for the entire width of the drum of Figure 5 or spacing members of Figure 2.

It may be desirable to provide a drum construction for the form of the invention of Figures 1 and 2 in place of the spacing members or to provide spacing members for the form of the invention of Figures 4 and 5. In other words, the two forms of hose supporting means is interchangeable.

The axle of either form is only rotated when it is desired to position the handle members beneath the reel to support the reel on the handle members with the wheels in freely rotating position, when winding or unwinding a hose upon the reel.

The handle members may be readily detached by removing the outside pair of nuts in order to conveniently store the reel and handles in a shipping carton.

The foregoing description of the invention is explanatory thereof and various changes in size, shape and materials, as well as in the details of the illustrated construction may be made within the scope of the appended claims without departing from the spirit of the invention.

We claim:

1. A hose reel and combined handle, said hose reel comprising a pair of wheels including a pair of rims, a pair of hub plates, spoke-like members connected to said rims, and means connecting said spoke-like members to said hub plates, a hollow sleeve, means connecting said sleeve to said hub plate, both said means being located on the same side of the hub plate and in spaced relation to each other, separator means extending between said hub plates, an axle extending through said sleeve, a handle comprising a pair of handle members and a link connecting said handle members to each other, and means comprising two pairs of nuts threadedly engaging each end of said axle, each pair comprising an inner and an outer nut mounting said handle members on said axle, said axle having an intermediate smooth bearing surface for rotatably supporting in direct bearing contact the inner surface of said sleeve, whereby said sleeve may freely rotate on said axle, said hub plates being mounted in vertical planes passing through the said smooth bearing surface of said axle, the inner nut of each pair presenting a surface for engagement by said second named means whereby to form stops at each end of said shaft for said sleeve, the said means mounting said handle members on said axle also including apertured ends of said handle members, the ends of the axle extending through the said apertured ends of said handle members, with one nut of each pair being located on one side and the other nut of said pair located on the opposite side of an apertured handle member end.

2. A hose reel and combined handle, said hose reel comprising a pair of wheels including a pair of rims, a pair of hub plates, spoke-like members connected to said rims, and means connecting said spoke-like members to said hub plates, a hollow sleeve, means connecting said sleeve to said hub plate, both said means being located on the same side of the hub plate and in spaced relation to each other, separator means extending between said hub plates, an axle extending through said sleeve, a handle comprising a pair of handle members and a link connecting said handle members to each other, and means comprising two pairs of nuts threadedly engaging each end of said axle, each pair comprising an inner and an outer nut mounting said handle members on said axle, said means connecting said hollow sleeve to said hub plates comprising turned over ends on said hollow sleeve, said ends being rigidly connected to said hub plates, said axle having an intermediate smooth bearing surface for rotatably supporting in direct bearing contact the inner surface of said sleeve, whereby said sleeve may freely rotate on said axle, said hub plates being mounted in vertical planes passing through the said smooth bearing surface of said axle, the inner nut of each pair presenting a surface for engagement by said second named means whereby to form stops at each end of said shaft for said sleeve, the said means mounting said handle members on said axle also including apertured ends of said handle members, the ends of the axle extending through the said apertured ends of said handle members, with one nut of each pair being located on one side and the other nut of said pair located on the opposite side of an apertured handle member end.

3. A hose reel and combined handle, said hose reel comprising a pair of wheels including a pair of rims, a pair of hub plates, spoke-like members connected to said rims, and means connecting said spoke-like members to said hub plates, a hollow sleeve, means connecting said sleeve to said hub plate, both said means being located on the same side of the hub plate and in spaced relation to each other, separator means extending between said hub plates, an axle extending through said sleeve, a handle comprising a pair of handle members and a link connecting said handle members to each other, and means comprising two pairs of nuts threadedly engaging each end of said axle, each pair comprising an inner and an outer nut mounting said handle members on said axle, said hub plates having outwardly extending portions and said means connecting said hollow sleeve to said hub portions comprising radially extending portions on the ends of said sleeve rigidly engaging the outwardly extending portions of said hub plates, said axle having an intermediate smooth bearing surface for rotatably supporting in direct bearing contact the inner surface of said sleeve, whereby said sleeve may freely rotate on said axle, said hub plates being mounted in vertical planes passing through the said smooth bearing surface of said axle, the inner nut of each pair presenting a surface for engagement by said second named means whereby to form stops at each end of said shaft for said sleeve, the said means mounting said handle members on said axle also including apertured ends of said handle members, the ends of the axle extending through the said apertured ends of said handle members, with one nut of each pair being located on one side and the other nut of said pair located on the opposite side of an apertured handle member end.

4. A hose reel and combined handle, said hose reel comprising a pair of wheels including a pair of rims, a pair of hub plates, and spoke-like members connecting said hub plates to said rims, separator means extending between said hub plates, a hollow bearing sleeve, an axle extending through said bearing sleeve, a handle comprising a pair of handle members and a link connecting said handle members to each other, and means comprising two pairs of nuts threadedly engaging each end of said axle, each pair comprising an inner and an outer nut mounting said handle members on said axle, said spoke-like members each extending entirely across the inner diameter of one of said wheels, said axle having an intermediate smooth bearing surface for rotatably supporting in direct bearing contact the inner surface of said bearing sleeve, whereby said bearing sleeve may freely rotate on said axle, said hub plates being mounted in vertical planes passing through the said smooth bearing surface of said axle, the inner nut of each pair presenting a surface for engagement by said second named means whereby to form stops at each end of said shaft for said sleeve, the said means mounting said handle members on said axle also including apertured ends of said handle members, the ends of the axle extending through the said apertured ends of said handle members, with one nut of each pair being located on one side and the other nut of said pair located on the opposite side of an apertured handle member end.

References Cited in the file of this patent

UNITED STATES PATENTS

| | | |
|---|---|---|
| 818,990 | Wirt et al. | Apr. 24, 1906 |
| 1,261,324 | Tuttle | Apr. 2, 1918 |
| 1,648,568 | Stoffel | Nov. 8, 1927 |
| 1,819,707 | German | Aug. 18, 1931 |
| 1,845,590 | Edwards | Feb. 16, 1932 |
| 1,946,764 | Schaub | Feb. 13, 1934 |
| 2,284,426 | Howsam | May 26, 1942 |
| 2,441,437 | Morrone | May 11, 1948 |